(12) United States Patent
Rajasekaran et al.

(10) Patent No.: US 11,552,891 B1
(45) Date of Patent: Jan. 10, 2023

(54) SELF-CONFIGURATION OF NETWORK DEVICES WITHOUT USER SETTINGS

(71) Applicant: Schweitzer Engineering Laboratories, Inc., Pullman, WA (US)

(72) Inventors: Manodev J. Rajasekaran, Pullman, WA (US); Greg Rzepka, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 79 days.

(21) Appl. No.: 17/372,887

(22) Filed: Jul. 12, 2021

(51) Int. Cl.
*H04L 45/745* (2022.01)
*H04L 49/00* (2022.01)
*H04L 49/25* (2022.01)
*H04L 45/16* (2022.01)

(52) U.S. Cl.
CPC ............ *H04L 45/745* (2013.01); *H04L 45/16* (2013.01); *H04L 49/25* (2013.01); *H04L 49/30* (2013.01)

(58) Field of Classification Search
CPC ....... H04L 45/745; H04L 45/16; H04L 49/25; H04L 49/30
See application file for complete search history.

(56) References Cited

U.S. PATENT DOCUMENTS

| | | | |
|---|---|---|---|
| 6,847,297 B2 | 1/2005 | Lavoie | |
| 6,999,291 B2 | 2/2006 | Andarawis | |
| 7,058,482 B2 | 6/2006 | Fletcher | |
| 7,486,614 B2 | 2/2009 | Yu | |
| 9,001,656 B2 | 4/2015 | Iwata | |
| 9,065,766 B2 | 6/2015 | Matsuoka | |
| 9,300,591 B2 | 3/2016 | Rajasekaran | |
| 10,979,330 B2 | 4/2021 | Rajasekaran | |
| 11,128,481 B2 | 9/2021 | Rajasekaran | |
| 2014/0074415 A1 | 3/2014 | Rudolph | |
| 2021/0126917 A1* | 4/2021 | Lin | H04W 40/02 |

OTHER PUBLICATIONS

Skendzic, Veselin; Ender, Ian; Zweigle, Greg: "IEC 61850-9-2 Process Bus and Its Impact on Power System Protection and Control Reliability" Apr. 3-5, 2007.
IEEE Instrumentation and Measurment Society, "IEEE Standard for a Precision Clock Synchronization Protocol for Networked Measurement and Control Systems" Jun. 16, 2020.
ABB "Substation Automation: We are energizing the digital grid I am SAM600 process bus IO system" ABB Switzerland Ltd, 2014.
Damien Tholomier and Denis Chatrefou "IEC 61850 Process Bus— It is Real!" PAC World—Winter 2008 Issue, May 2008.
SIEMENS "SIPROTEC 7SC805 Merging Unit for Conventional Instrument Transformer" SIEMENS AG, Mar. 2015.
Reason "MU320 Merging Unit", 2014.

* cited by examiner

*Primary Examiner* — Jianye Wu
(74) *Attorney, Agent, or Firm* — Bradley W. Schield

(57) ABSTRACT

A method includes obtaining, via a power system device, a source media access control (SMAC) address. The method includes generating, via the power system device, an Ethernet frame of power system data with a destination media access control (DMAC) address comprising at least a portion of the SMAC address. The method includes sending, via the power system device, the Ethernet frame to an intelligent electronic device (IED) of a power system.

20 Claims, 4 Drawing Sheets

SELF-CONFIGURATION OF NETWORK DEVICES WITHOUT USER SETTINGS

TECHNICAL FIELD

The present disclosure relates generally to power system communication and, more particularly, to automatically generating destination media access control (DMAC) addresses for devices in a power system.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

Figure 1:
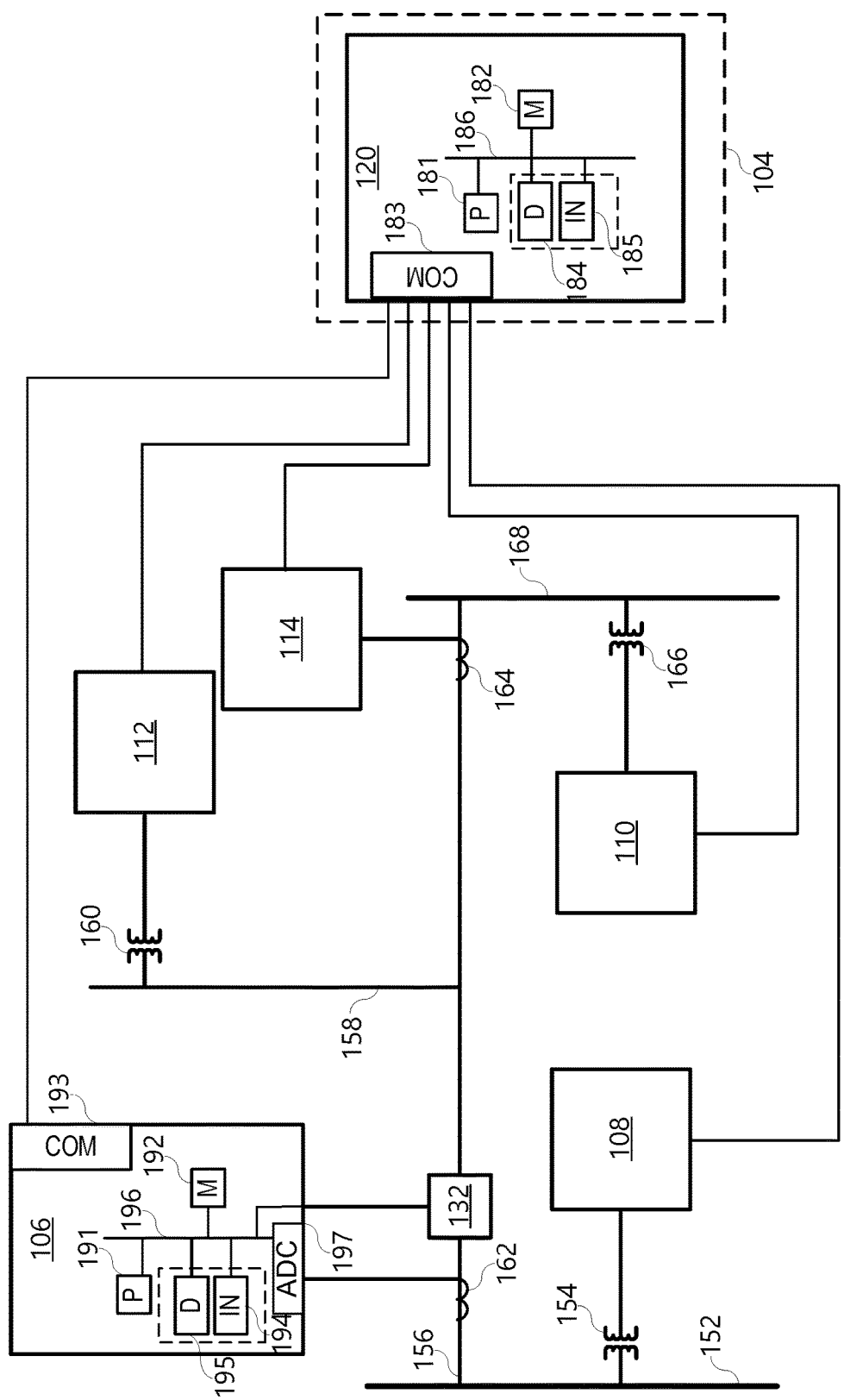
FIG. 1 is a one-line diagram of an electric power delivery system having a communication network with merging units that communicate with an intelligent electronic device (IED), in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems include equipment, such as generators, power lines, and transformers, to provide electrical energy from sources to loads. Various intelligent electronic devices (IEDs) may be used in monitoring, control, and protection of the power delivery system IEDs may communicate power system data with other IEDs, such as raw and processed voltage measurements, raw and processed current measurements, protection signals and circuit breaker status, among others.

IEDs may obtain various power system measurements from the power system, such as voltage measurements, current measurements, circuit breaker status signals, and the like. One technique for obtaining power system measurements is using analog sensors to detect power system characteristics. For example, an IED may obtain analog voltage signals proportional to the voltage on the power system. The IED may convert the analog signals to digitized voltage measurements via an analog-to-digital converter. The IED may then perform control actions based on the digitized voltage measurements.

Another technique for obtaining power system measurements is by using merging units that communicate power system data to the IED. Merging units may obtain analog power system signals and digitize the power system signals to a digitized measurement. The merging unit may communicate the digitized power system measurements to an IED to allow the IED to perform control actions. For example, the merging unit may obtain voltage measurements, current measurements, or circuit breaker status signals.

Setting up each power system device, such as the IED and the merging unit, to communicate with each other may a time consuming task. During commissioning, an operator may input a destination media access control (DMAC) address into the IED for each protocol being communicated on the IED For example, an IED may be assigned a first DMAC address for Generic Object Oriented Substation Event (GOOSE) messages and a second DMAC address for sampled values messages. Further, to prevent errors/miscommunications, the operator may be tasked with assigning a unique DMAC address for each communication protocol and device while ensuring that the receiving device can recognize the address. Accordingly, there is a need in the field to allow faster and easier configuration of IED communication between devices.

As explained below, a power system device may self-configure DMAC addresses using a source media access control (SMAC) address of the IED SMAC addresses may be set in manufacturing and may be unique to any other SMAC address assigned to other devices. The DMAC address may be set as a portion of the SMAC address, a pre-defined value associated with a protocol, and a stream number such that each DMAC address is unique in the communication network. By having automatically generated DMAC addresses of the power system device, the configuration process may be simplified.

FIG. 1 illustrates a simplified one-line diagram of an electric power delivery system that includes buses 152 and 168 connected using line 156, which feeds a branch 158. Voltages from bus 152 are sampled using merging unit 108 and a PT 154. Voltages from bus 168 are sampled using merging unit 110 and a PT 166. Currents at each end of line 156 are sampled using merging units 106 and 114 in communication with CTs 162 and 164, respectively. Voltages on the branch 158 are sampled using merging unit 112 in communication with PT 160. The merging units may be at different locations or within the same switchyard. The merging units are in communication with IED 120, with each merging unit being connected with the IED 120 with a separate physical media for point-to-point communication with the IED 120.

In various embodiments, IED 120 may control operations of equipment on the electric power delivery system using the merging units. For example, merging unit 106 may be in communication with breaker 132. Upon a command from IED 120, merging unit 106 may command breaker 132 to open and/or close IED 120 may receive and send communications with the merging units using the various communication media, such as an Ethernet. For example, the IED 120 may be connected to the merging unit 106 via a wired Ethernet network through a switch or direct Ethernet connection.

As used herein, an IED (such as IED 120) may refer to any microprocessor-based device that monitors, controls, automates, and/or protects monitored equipment within the power system. Such devices may include, for example, remote terminal units, differential relays, transformer relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

The IED 120 may obtain electric power system data from the merging units 106, 108, 110, 112, and 114 and detect events, such as fault events, on the power lines 156 and 158 or buses 152 and 168 using the digitized current and digitized voltage measurements from the merging units 106, 108, 110, 112, and 114. Further, the IED 120 may send power system data, such as circuit breaker control signals, to the merging unit 106 to open (i.e., trip) or close the CB 132 based on the power system data.

The IED 120 may include one or more processors 181, a computer-readable medium (e.g., memory 182), a communication interface (e.g., Ethernet ports) 183, a display terminal 184, and input structures (e.g., buttons, controls, etc.) 185 communicatively coupled to each other via one or more communication buses 186. The processor 181 may be embodied as a microprocessor, a general-purpose integrated circuit, an application specific integrated circuit (ASIC), a field programmable gate array (FPGA), and/or other programmable logic devices. It should be noted that the processor 181 and other related items in FIG. 1 (e.g., the memory 182) may be generally referred to herein as "processing circuitry." Furthermore, the processing circuitry may be a single contained processing module or may be incorporated wholly or partially within any of the other elements within the IED 120. It should be noted that FIG. 1 is merely one example of a particular implementation and is intended to illustrate the types of components that may be present in the IED 120.

In the IED 120 of FIG. 1, the processor 181 may be operably coupled with the memory 182 to perform various algorithms. Such programs or instructions executed by the processor 181 may be stored in any suitable article of manufacture that includes one or more tangible, computer-readable media at least collectively storing the instructions or routines, such as the random-access memory (RAM) and the read-only memory (ROM).

Similarly, each merging unit (such as merging unit 106, 108, 110, 112, and 114) may include one or more processors 191, a computer-readable medium (e.g., memory 192), a communication interface (e.g., Ethernet ports) 193, a display terminal 195, and input structures (e.g., buttons, controls, etc.) 194 communicatively coupled to each other via one or more communication buses 196, which may perform similar functions/operations to those described with respect to the IED 120. As illustrated, the merging unit 106 may include one or more analog-to-digital converters (ADCs) 197 that receive analog power system signals from the power system and convert the analog power systems into digital power system measurements, such as digital voltage measurements, digital current measurements, and the like. Further, the merging unit 106 may receive digital input signals from the circuit breaker 132 indicating the circuit breaker status. The processor 191 of the merging unit 106 may generate power system messages with power system data to send to the IED 120. For example, the processor 191 may obtain the digitized power system measurements from the ADC converter and insert the power system measurements into a communication frame to be sent to the IED 120. Different communication frames may follow different communication protocols. For instance, Ethernet frames may communicate a source MAC address, a destination MAC address, and a payload, among others.

Figure 2:
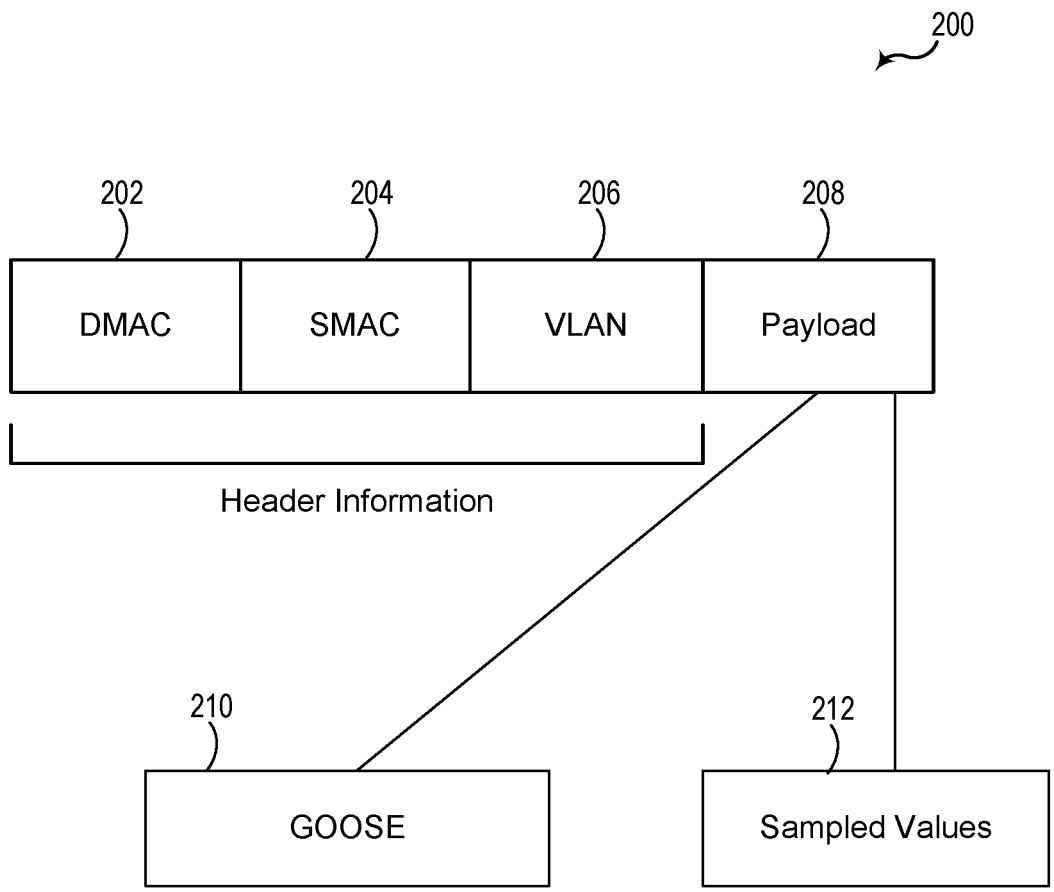
FIG. 2 is a diagram of an Ethernet frame communicated over the communication network of FIG. 1, in accordance with an embodiment.

FIG. 2 is a block diagram of the message format of an Ethernet frame that may be used in communication between IEDs and merging units. The Ethernet frame 200 may include a destination media access control DMAC) address 202, a source media access control (SMAC) address 204, a virtual local area network (VLAN) 206, and a payload 208. The payload 208 may be formatted according to various protocols, such as a GOOSE messaging format 210, a sampled values format 212, or any other suitable format.

The SMAC address 204 may be an address associated with hardware of the power system device that is unique to the power system device. For example, the SMAC address 204 may be stored in read only memory (ROM) or stored in hardware of the merging unit 106 and 108 by the manufacturer of the merging unit 106 and 108 to be used throughout the lifecycle of the merging unit 106 and 108.

In an Ethernet network, the DMAC address 202 may be assigned during configuration of communication of the power system device. As mentioned above, during commissioning, the merging units and/or the IED 120 may each be configured to use a DMAC address 202 that is unique for each power system device, each communication protocol, and each communication stream on the communication network. One technique to configure the power system devices (i.e., the merging unit 106 and 108 and the IED 120) to communicate with each other is by having an operator input DMAC addresses for each of the power system devices and each of the communication protocols. For example, an operator may enter a first DMAC address for a first GOOSE publication on the merging unit 108, a second DMAC address for a second GOOSE publication on the merging unit 108, etc. Further, the operator may enter the first and second DMAC addresses on the IED 120 to allow the IED 120 to subscribe to the GOOSE publications. However, such a configuration process of the communication network may be complex, time-consuming, and involve maintaining a master list of DMAC addresses of the communication network.

To reduce complexity and simplify configuration of the communication network, the power system devices may automatically self-configure network settings by generating a DMAC address that is unique on the communication network by using the SMAC address, the communication protocol, and a communication (e.g., publication/subscription) number (i.e., stream number). Further, the receiving device may determine any communication protocol connections based on the SMAC and automatically subscribe from/publish to Ethernet messages sent with the DMAC address.

Figure 3:
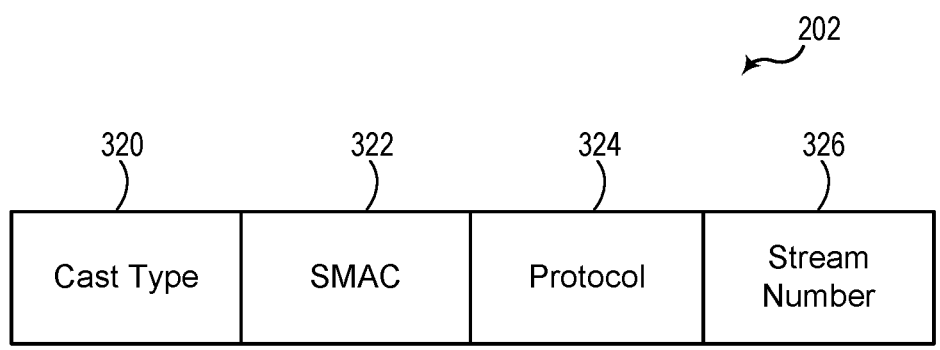
FIG. 3 is a diagram of a destination media access control (DMAC) address used in the Ethernet frame of FIG. 2, in accordance with an embodiment.

FIG. 3 is a block diagram of a format of the DMAC address 202 that may be generated by a power system device, such as the merging units 106 and 108 and/or the IED 120. The DMAC address 202 may include a cast type 320, an SMAC portion 322, a protocol identifier 324, and a stream number 326. To simplify the configuration process, the power system device may generate a unique DMAC address by using the SMAC address, which is uniquely set in manufacturing. In the illustrated embodiment, a portion of the SMAC address (e.g., a lower 3 octets of a 6 octet address) may be used to ensure that each power system device has a unique DMAC address. While the lower 3 octets are used as an example, any suitable combination of SMAC and/or manufacturer identifying values may be used. Table 1 shows an example of DMAC addresses that may be used by the merging unit 106 in sending Ethernet messages to the IED 120.

TABLE 1

DMAC addresses of merging unit 108

| | Destination MAC Address |
|---|---|
| GOOSE Publication | 03:XX:XX:XX:01:0Y |
| GOOSE Subscription | 03:XX:XX:XX:02:0Y |
| Sampled Values | 03:XX:XX:XX:03:0Y |

As illustrated, the first octet (first two hexadecimal values) may be the cast type 320 that indicates whether the message is unicast, multicast, or broadcast. For example, when the first octet is 03, that may be used to indicate that the message is a locally administered multicast address. The XX:XX:XX may be a portion of the SMAC address 204 of the power system device (e.g., the merging unit 106). In the illustrated embodiment, the lower three octets of the SMAC address 204 may be used as the second to fourth octets in the DMAC address (i.e., SMAC portion 322) to ensure that the DMAC addresses of each device on the network is unique with respect to the other devices. Further, the 01, 02, and 03 in the fifth octet of the DMAC address may refer to different communication protocols (i.e., protocol 324) used by power system device to ensure that each communication protocol uses a unique DMAC address with respect to other communication protocols. For example, 01 may be associated with GOOSE messaging protocol publications, 02 may be associated with GOOSE messaging protocol subscriptions, and 03 may be associated with the sampled value messaging protocol. While these are used as examples, any suitable numbering/messaging protocols may be used, which may also include, for example, modbus, Telnet, MMS, DNP, etc. The 0Y of the sixth octet may indicate the SV or GOOSE publication/subscription number (i.e., stream number 326). For instance, if the power system device has multiple GOOSE messaging publications, each may be associated with a unique value assigned in the sixth octet. While a particular layout of the DMAC is provided, note that the DMAC may include different ordering, sizes, numbering, and the like depending on the implementation.

This methodology ensures that the DMAC addresses are unique for any power system device, protocol, and stream number (e.g., publication/subscription number) in the communication network. Further, by having a predetermined process associated with how the DMAC addresses are generated by merging units 106 and 108, the IED 120 may automatically subscribe to each of the addresses by obtaining the SMAC address of the connected merging unit 106 and 108. For example, upon obtaining the SMAC address of the merging unit 106, the IED 120 may automatically subscribe and/or publish associated GOOSE messages to communicate with merging unit 106 by generating DMAC addresses corresponding to the subscription/publication. In some embodiments, the merging unit 106 may communicate the SMAC address to the IED 120 to initiate communication with the IED 120. In other embodiments, an operator may enter the SMAC or portions of the SMAC into the IED 120 to allow the IED 120 to determine any of the DMAC addresses that may be used in communication.

Figure 4:
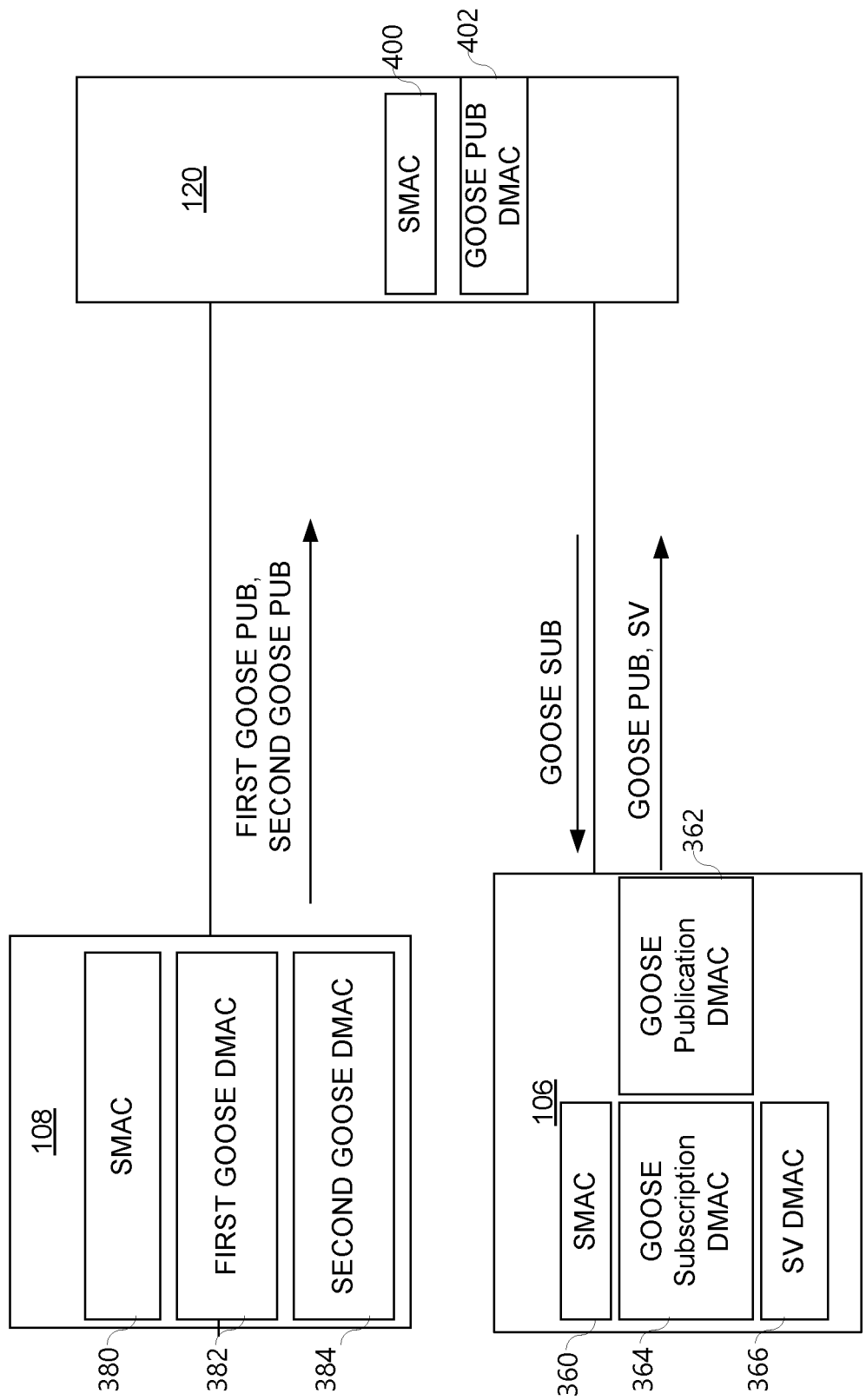
FIG. 4 is a network diagram the merging units and the IED of FIG. 1, in accordance with an embodiment.

FIG. 4 is a block diagram of the communication network between the merging units 106 and 108 and the IED 120 that uses automatic DMAC address generation. The blocks may represent addresses stored in the corresponding memory 182 and 192 of the devices.

Figure 5:
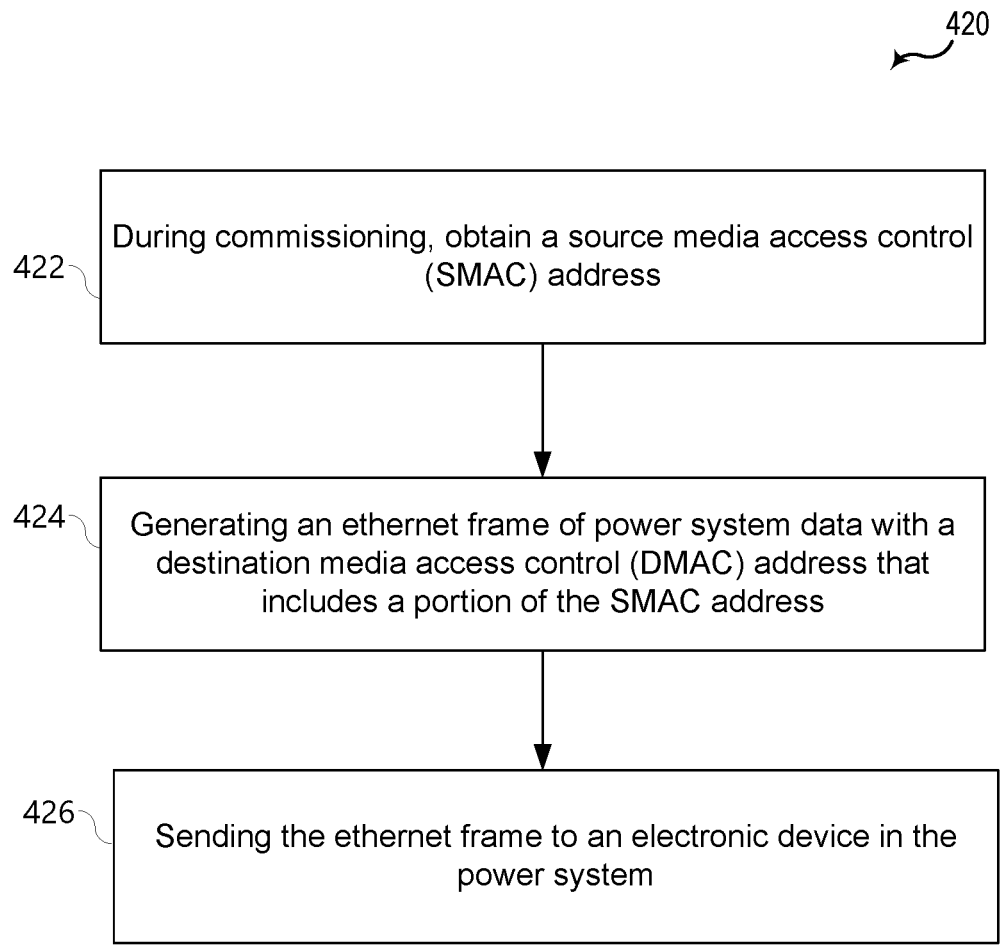
FIG. 5 is a flow diagram of a process performed to communicate Ethernet frames in the communication network of FIG. 4, in accordance with an embodiment.

FIG. 5 is a flow diagram of a process 420 that may be performed in communicating messages between power system devices on the power system and is discussed in conjunction with FIG. 4. During commissioning, an operator may communicatively connect the merging units 106 and 108 to the IED 120. For example, the merging units 106 and 108 may be connected directly (e.g., point-to-point) to the IED 120 (e.g., without a switch therebetween). In other embodiments, the merging units 106 and 108 and the IED 120 may each be connected to a switch by Ethernet cables. Alternatively, fiber optic cables may be connected between the merging units 106 and 108 and the IED 120. While Ethernet protocol, Ethernet cables, and fiber optics are used as examples, note that any suitable communication network may be used.

In the illustrated embodiment, during the commissioning process, the merging unit 106 may generate, from an SMAC 360 of the merging unit 106, a GOOSE publication DMAC 362, a GOOSE subscription DMAC 364, and a sampled values (SV) DMAC 366, similar to those described in table 1. For example, the merging unit 106 may obtain a portion of the SMAC of the merging unit 106 to be included in each of the DMAC addresses (block 422). The merging unit 108 may generate, from an SMAC 380, a first GOOSE publication DMAC 382 and a second GOOSE publication DMAC 384. The IED 120 may also generate, from an SMAC 400 of the IED 120, a GOOSE publication DMAC 402.

During operation (e.g., while the power system is online), the merging unit 106 may generate Ethernet frames of power system data with a DMAC that includes a portion of the SMAC address (block 424). The merging unit 106 may then send the Ethernet frames to the IED 120 in the power system to allow the IED 120 to perform power system operations (e.g., monitoring operations, control operations, protection operations) using the power system data (block 426). For example, the IED 120 may obtain power system data from the first GOOSE publication of merging unit 108 with DMAC 382 and from the GOOSE publication of merging unit 106 with DMAC 362. The IED 120 may then communicate trip signal to the merging unit 106 via the GOOSE publication with DMAC 402 to cause a circuit breaker to trip based on the power system data to protect portions of the power system.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A merging unit, comprising:
   a memory; and
   a processor operatively coupled to the memory, wherein the processor is configured to execute instructions stored on the memory to cause operations comprising:
   obtaining a source media access control (SMAC) address;
   generating an Ethernet frame of power system data with a destination media access control (DMAC) address comprising at least a portion of the SMAC address; and
   sending the ethernet frame to an intelligent electronic device (IED) of a power system.

2. The merging unit of claim 1, wherein the merging unit is connected directly to the IED via a point-to-point connection.

3. The merging unit of claim 1, wherein the DMAC address comprises a message type portion indicating a unicast message, multicast message, or broadcast message.

4. The merging unit of claim 1, wherein the DMAC comprises a protocol identifier indicating a protocol of the Ethernet frame.

5. The merging unit of claim 4, wherein the protocol portion indicates that the protocol is one of a Generic Object Oriented Substation Event (GOOSE) message, a sampled values message, a modbus message, or a distributed network protocol message.

6. The merging unit of claim 1, wherein the DMAC comprises a stream identifier indicating a publication number or subscription number associated power system data of the Ethernet frame.

7. The merging unit of claim 6, wherein each publication number or subscription number of the merging unit is unique for each protocol communicated by merging unit.

8. The merging unit of claim 1, wherein the merging unit is configured to automatically generate the DMAC address according to a standard format such that the IED communicating with the merging unit is allowed to automatically identify any DMAC addresses associated with the merging unit upon obtaining the SMAC of the merging unit.

9. The merging unit of claim 1, wherein three octets of the SMAC address are used in the DMAC address to ensure that the DMAC address is unique for each power system device on a communication network of the merging unit.

10. The merging unit of claim 1, wherein the SMAC address is a fixed address of hardware of the merging unit assigned during manufacturing of the merging unit.

11. The merging unit of claim 1, comprising one or more sensors configured to monitor the power system, wherein the merging unit is configured to obtain power system measurements of the power system.

12. A method, comprising:
    obtaining, via a power system device, a source media access control (SMAC) address;
    automatically generating, via the power system device, a first destination media access control (DMAC) address by using at least a portion of the SMAC address;
    generating, via the power system device, an Ethernet frame of power system data, wherein the Ethernet frame comprises the first DMAC address; and
    sending, via the power system device, the Ethernet frame to an intelligent electronic device (IED) of a power system.

13. The method of claim 12, comprising:
    generating the first DMAC address having a first protocol identifier associated with a first communication protocol;
    generating a second DMAC address having a second protocol identifier associated with a second communication protocol, different from the first communication protocol, wherein the second DMAC address has the same portion of the SMAC address as in the first DMAC address.

14. The method of claim 13, wherein the first DMAC address has a first stream identifier associated with a first publication number, wherein the method comprises generating a third DMAC address having a second stream identifier associated with a second publication number, different from the first stream identifier, wherein the third DMAC address has the same portion of the SMAC address as in the first DMAC address and the same protocol identifier as in the first DMAC address.

15. The method of claim 12, comprising:
    receiving, via sensors of the power system device, analog signals indicating characteristics of the power system; and
    generating digital power system measurements based on the analog signals;
    inserting the digital power system measurements into the Ethernet frame; and
    sending the Ethernet frame comprising the SMAC, the DMAC, and the digital power system measurements to the IED.

16. The method of claim 15, wherein the digital power system measurements comprise a voltage measurement or a current measurement of the power system.

17. The method of claim 12, comprising:
    receiving a signal indicating a circuit breaker status of the power system; and
    generating the Ethernet frame comprising the SMAC, the DMAC, and the circuit breaker status of the power system.

18. An intelligent electronic device (IED), comprising:
    a memory; and
    a processor operatively coupled to the memory, wherein the processor is configured to execute instructions stored on the memory to cause operations comprising:
    obtaining a source media access control (SMAC) address;
    generating an Ethernet frame of power system data with a destination media access control (DMAC) address comprising at least a portion of the SMAC address; and
    sending the Ethernet frame to an intelligent electronic device (IED) of a power system.

19. The IED of claim 18, wherein the processor is configured to cause operations comprising send a trip signal to a merging unit to cause the merging unit to trip a circuit breaker in the power system, thereby disconnecting a portion of the power system.

20. The IED of claim 18, wherein the processor is configured to cause operations comprising: automatically generating the DMAC address by using at least a portion of the SMAC address according to a standard format.

* * * * *